July 11, 1933.                A. WALLACE                1,918,156
                           CENTERING BEARING
                       Original Filed July 23, 1931
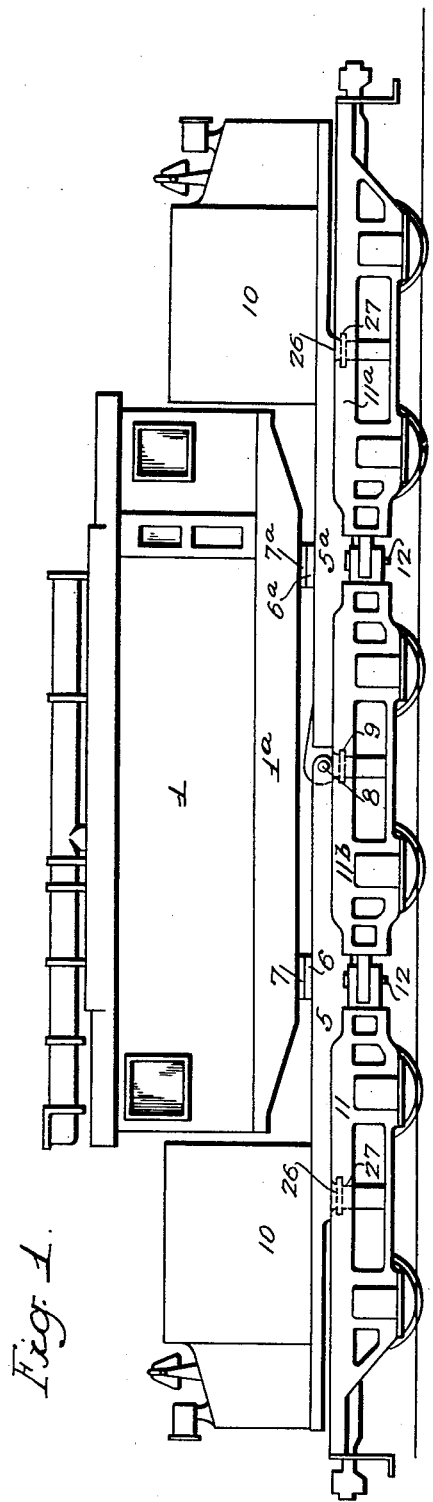
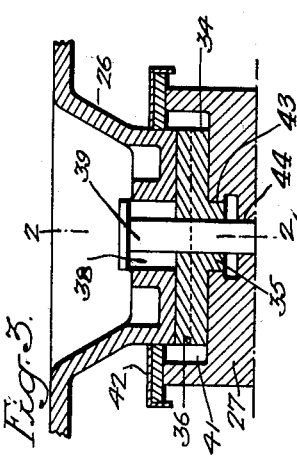
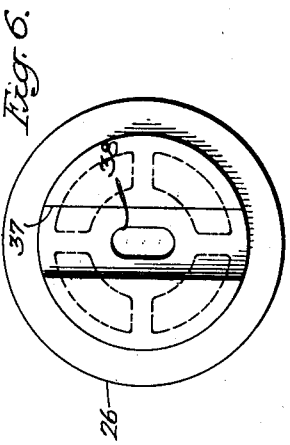
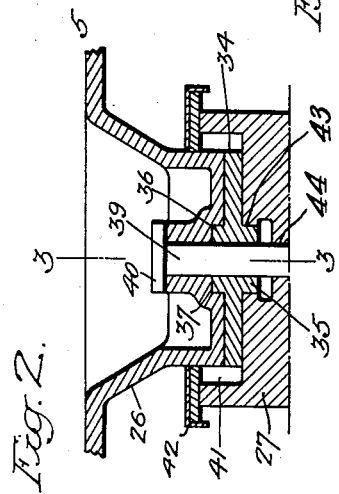
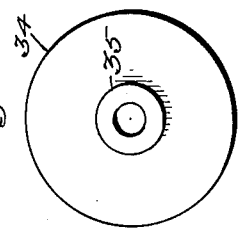
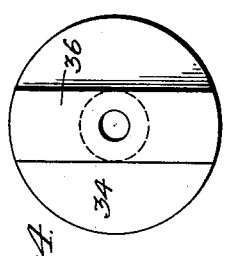
Inventor:
Allen Wallace
by his Attorneys
Howson & Howson Patented July 11, 1933

1,918,156

UNITED STATES PATENT OFFICE

ALLEN WALLACE, OF MOORESTOWN, NEW JERSEY

CENTERING BEARING

Original application filed July 23, 1931, Serial No. 552,714, now Patent No. 1,888,190, dated November 15, 1932. Divided and this application filed June 15, 1932. Serial No. 617,450.

This application is a division of my application for patent filed July 23, 1931, Serial Number 552,714, and which matured into U. S. Patent No. 1,888,190, dated Nov. 15, 1932.

This invention relates particularly to locomotives which are electrically propelled and in which the power plant is in the cab which supplies current through motors to the axles of the truck.

This invention relates particularly to the center bearings of each outside truck.

The object of the invention is to so design the center bearing of each outside truck so as to take care of any foreshortening of the longitudinal distance between the center pins of the middle and the outside trucks when the locomotive is entering or leaving a curved track.

While the invention is particularly adapted to locomotives it may be applied to other rolling stock.

In the accompanying drawing:

Fig. 1 is a diagrammatic side view showing an oil electric locomotive to which my invention is applied;

Fig. 2 is a sectional view of my improved bearing on the line 2—2, Fig. 3;

Fig. 3 is a sectional elevation on the line 3—3, Fig. 2;

Fig. 4 is a plan view of the ribbed plate;

Fig. 5 is an inverted plan view of said plate; and

Fig. 6 is an inverted plan view of the upper center bearing.

Referring to Fig. 1 in the first instance, 1 is the cab of a locomotive of the oil electric type. This cab is mounted on a cab frame 1a. 5 is the front sub-frame and 5a is the rear sub-frame in the present instance, and each frame has lower center bearings 6—6a for the upper center bearings 7—7a secured to the cab frame 1. The two sub-frames 5—5a are connected by an articulated joint 8, on which is a center pin 9. On the outer end of each sub-frame is a hood 10 which may contain auxiliary apparatus. The locomotive is provided with three sets of trucks 11—11a and 11b, which are coupled together by pins 12 in the present instance. The sub-frames are supported by the three trucks. Each end truck 11—11a has a lower center bearing 27 for the upper center bearings 26 projecting from the underside of the sub-frames 5—5a, and the central truck 11b has a bearing for the center pin 9 of the coupling 8 which connects the two frames 5—5a. The upper bearings 26 have a certain amount of longitudinal movement in respect to the lower bearing 27, so as to accommodate the foreshortening of the longitudinal distance between center pins of the middle truck and the bearings of the outside trucks when the locomotive is passing over a curved track.

I will now describe the details of the center bearing to which my invention relates. The front upper center bearing 7 of the cab frame 1a has no longitudinal movement in its bearing 6 but the rear upper center bearing 7a has a slight longitudinal movement in its bearing so that the sub-frames will accommodate themselves to the curve of the track. The construction of the upper center bearing 7a and the lower bearing 6a is similar to that of the bearings 26 of the sub-frames on the trucks.

Referring now to Figs. 2 to 6 inclusive, the lower bearing 27 has a recess 41 therein in which is located a plate 34. The upper bearing 26 is less in diameter than the recess 41 in the lower bearing 27, so as to allow it to have a certain amount of horizontal movement independent of the lower bearing. Resting on the lower bearing 27 is a cover plate 42, through which the bearing 26 extends and this cap plate is greater in diameter than the bearing 27 and moves with the upper bearing 26 and forms a dust shield for the recess 41. The plate 34, which is located in the recess 41 is in the form of a disk as shown clearly in Figs. 4 and 5. This plate has a hub 35 which extends into an opening 43 in the lower center bearing 27, holding the plate in the central position but allowing it to rotate on the said center bearing 27. On the plate 34 is a rib 36 forming a key which extends into a groove 37 in the underside of the upper center bearing 26, and in this upper center bearing is a slot 38, which extends parallel with the groove 37. A bolt 39 extends through the slot 38, entirely through the plate 34, and into an opening 44 in the lower bearing 27, as clearly shown in Figs. 2 and 3. This bolt has an enlarged head 40, which rests upon the upper center bearing 26. By this construction the upper center bearing 26 can slide horizontally on the plate 34, and it is guided by the rib 36 on the plate 34. The movement is limited by the length of the slot 38 in the upper center bearing 26. The movement, however, is sufficient to allow the end trucks to accommodate themselves to a curvature of the track.

As stated above, the center bearing 7 on the cab frame 1a, and its bearing 6, are similar to the center bearing of the central truck, having no other movement except a slight rotary movement but the rear upper bearing 7a on the cab frame 1a is constructed in a manner similar to the center bearing 26 at the front and rear of the sub-frames which have their bearings in the front and rear trucks. By constructing the center bearings of the end trucks so that they will allow for foreshortening of the longitudinal distance between the center bearings of the middle and outside trucks, the locomotive is enabled to pass freely over curves.

I claim:

1. The combination in a pivot bearing, of a lower bearing having a recess therein; a plate located in the recess, said lower bearing having a central extension of the recess, the plate having a hub extending into said extension of the recess so that the plate is free to turn in the bearing, said plate having a key rib projecting upwardly therefrom; and an upper bearing extending into the main recess of the lower bearing and less in diameter than the recess and having a groove in its underside, into which the key rib projects to allow the upper bearing to have a certain horizotal movement in the lower bearing, the upper bearing and the plate being free to turn in the lower bearing.

2. The combination in a pivot bearing, of a lower bearing having a recess therein; a plate mounted in the recess; a hub on the underside of the plate, the lower bearing having a continuation of the recess and of less diameter than the main recess into which the hub extends, so that the plate can turn freely in the lower bearing, the plate having an upwardly extending key rib; an upper bearing extending into the recess of the lower bearing and less in diameter than said recess, said upper bearing having a groove in its underside, into which the key rib extends, the upper bearing having a slot extending therethrough; and a bolt extending through the slot and through the plate and into an opening in the lower bearing, said bolt having a head resting on the upper bearing so as to lock the upper bearing to the lower bearing but allowing the upper bearing to have a rotary motion as well as a limited horizontal movement in the lower bearing.

ALLEN WALLACE.